US012266806B2

(12) United States Patent
Su et al.

(10) Patent No.: US 12,266,806 B2
(45) Date of Patent: Apr. 1, 2025

(54) BATTERY CELL, BATTERY, ELECTRICAL DEVICE, AND MANUFACTURING METHOD AND DEVICE FOR BATTERY CELL

(71) Applicant: CONTEMPORARY AMPEREX TECHNOLOGY (HONG KONG) LIMITED, Hong Kong (CN)

(72) Inventors: Huasheng Su, Ningde (CN); Chengyou Xing, Ningde (CN); Quankun Li, Ningde (CN); Jing Zhang, Ningde (CN); Haizu Jin, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 134 days.

(21) Appl. No.: 17/976,882

(22) Filed: Oct. 31, 2022

(65) Prior Publication Data
US 2023/0048125 A1    Feb. 16, 2023

Related U.S. Application Data

(63) Continuation of application No. PCT/CN2021/109912, filed on Jul. 30, 2021.

(51) Int. Cl.
*H01M 50/152* (2021.01)
*H01M 50/536* (2021.01)
*H01M 50/636* (2021.01)

(52) U.S. Cl.
CPC ....... *H01M 50/152* (2021.01); *H01M 50/536* (2021.01); *H01M 50/636* (2021.01); *H01M 2220/20* (2013.01)

(58) Field of Classification Search
CPC ............. H01M 50/152; H01M 50/536; H01M 50/636; H01M 2220/20; H01M 50/107; H01M 50/169; Y02E 60/10
See application file for complete search history.

(56) References Cited

U.S. PATENT DOCUMENTS 6,456,484 B1 * 9/2002 Matsuoka .............. H01G 11/26
361/511
10,777,802 B2 * 9/2020 Mori .................... H01G 9/0029
(Continued)

FOREIGN PATENT DOCUMENTS

CN    102867936 A    1/2013
CN    206619636 U    11/2017
(Continued)

OTHER PUBLICATIONS

Office Action issued Mar. 30, 2024 in Chinese Patent Application No. 202180006574.8 with English translation.
(Continued)

*Primary Examiner* — Michael L Dignan
(74) *Attorney, Agent, or Firm* — XSENSUS LLP

(57) ABSTRACT

A battery cell may comprise: an electrode assembly, a housing and an end cap. The electrode assembly may have a first tab. The housing may have an opening for accommodating the electrode assembly. The end cap may be configured to connect with the housing and cover the opening. The end cap may have an abutting surface and a welding groove, the abutting surface may be configured to abut against the first tab, and the welding groove may be recessed from one side of the end cap away from the electrode assembly towards the abutting surface. The end cap may form a connector between the abutting surface and the bottom surface of the welding groove, and the connector is configured for being welded with the first tab. The end cap is provided with a reinforcing structure, and the reinforcing structure is protruded from the bottom surface.

17 Claims, 6 Drawing Sheets

(56) References Cited

U.S. PATENT DOCUMENTS

| | | | |
|---|---|---|---|
| 2006/0203429 A1* | 9/2006 | Thrap | H01G 2/02 |
| | | | 361/502 |
| 2009/0087733 A1* | 4/2009 | Yoon | H01M 50/171 |
| | | | 429/246 |
| 2011/0256433 A1* | 10/2011 | Fuhr | H01M 4/70 |
| | | | 429/211 |
| 2017/0006740 A1 | 1/2017 | Douglas | |
| 2021/0218095 A1* | 7/2021 | Narbonne | H01M 10/647 |

FOREIGN PATENT DOCUMENTS

| | | |
|---|---|---|
| CN | 112713345 A | 4/2021 |
| CN | 112768845 A | 5/2021 |
| CN | 112909392 A | 6/2021 |
| CN | 213483848 U | 6/2021 |
| CN | 113097633 A | 7/2021 |
| CN | 215266481 U | 12/2021 |
| JP | 2004071266 A | 3/2004 |
| JP | 2009087915 A | 4/2009 |
| JP | 2019-175690 A | 10/2019 |
| WO | 2020/103014 A1 | 5/2020 |

OTHER PUBLICATIONS

International Search Report and Written Opinion mailed on Mar. 15, 2022, in corresponding PCT/CN2021/109912, 11 pages.
Notice of Grant issued on Nov. 30, 2021, in corresponding Chinese patent Application No. 202121777448.6, 2 pages.
Office Action issued on Nov. 7, 2023, in corresponding Japanese patent Application No. 2022-551244, 5 pages.
Extended European Search Report issued Jun. 21, 2024 in European Patent Application No. 21936236.5.
Notification to Grant Patent Right for Invention issued Jul. 1, 2024 in Chinese Patent Application No. 202180006574.8 with English translation.
Decision to Grant a Patent issued May 7, 2024 in Japanese Patent Application No. 2022-551244 with English translation.

* cited by examiner

BATTERY CELL, BATTERY, ELECTRICAL DEVICE, AND MANUFACTURING METHOD AND DEVICE FOR BATTERY CELL

CROSS-REFERENCE TO RELATED APPLICATION

This application is a continuation of International Application No. PCT/CN2021/109912, filed Jul. 30, 2021, which is incorporated herein by reference in its entirety.

TECHNICAL FIELD

The present application relates to the field of battery technology, and in particular, to a battery cell, a battery, an electrical device, and a method and a device for manufacturing the battery cell.

BACKGROUND ART

Batteries are widely applied in electronic devices, such as, mobile phones, laptops, battery cars, electric cars, electric planes, electric boats, electric toy cars, electric toy boats, electric toy planes and power tools, etc.

In battery technology, both safety and service life of the battery cells need to be considered. Therefore, how to improve the service life of battery cells is an urgent problem to be solved in battery technology.

SUMMARY

Embodiments of the present application provide a battery cell, a battery, an electrical device, and a method and a device for manufacturing the battery cell, which can effectively improve the service life of the battery cell.

In the first aspect, an embodiment of the present application provides a battery cell, comprising: an electrode assembly, having a first tab; a housing, having an opening, with the housing configured for receiving the electrode assembly; and an end cap, configured for connecting with the housing and covering the opening, wherein the end cap has an abutting surface and a welding groove, the abutting surface is configured for abutting against the first tab, the welding groove is recessed from one side of the end cap away from the electrode assembly towards the abutting surface, the end cap forms a connection part between the abutting surface and a bottom surface of the welding groove, and the connection part is configured for being welded with the first tab, wherein the end cap is provided with a reinforcing part, the reinforcing part is protruded from the bottom surface, and the reinforcing part is configured for enhancing a strength of the connection part.

In the above technical solution, the end cap is provided with a reinforcing part which is protruded from the bottom surface of the welding groove, and the reinforcing part can strengthen the connection part configured for being welded with the first tab, improving the strength of the connection part, reducing the risk of failure of the battery cell due to the damage of the connection part under pressure, and effectively improving the service life of the battery cell.

In some embodiments, the connection part is welded with the first tab to form a weld mark, the weld mark comprises a first part and a second part that are continuously arranged, and the first part is formed at the reinforcing part, and the second part is formed on the connection part.

In the above technical solution, one part of the weld mark is formed on the reinforcing part, and the second part of the weld mark is formed on the connection part, which can reduce the risk that the connection part is punched through by the welding, due to the high initial welding temperature.

In some embodiments, in a thickness direction of the end cap, the reinforcing part has a first end and a second end oppositely arranged, and the first end is connected to the bottom surface; and a dimension of the reinforcing part in an extending direction of the welding groove gradually decreases from the first end to the second end, so that at least one side of the reinforcing part in the extending direction is provided with a sloping surface, the sloping surface is connected to the bottom surface, and the first part is formed on the sloping surface.

In the above technical solution, the dimension of the reinforcing part in the extending direction of the welding groove gradually decreases from the first end of the reinforcing part, which is connected to the bottom surface, to the second end of the reinforcing part, which is away from the bottom surface, so that the reinforcing part is of a structure with gradient thickness, which ensures the reinforcement part has better strengthening ability and at the same time saves material. In addition, since the reinforcing part is of the structure with gradient thickness, at least one side of the reinforcing part in the extending direction of the welding groove forms a sloping surface connected to the bottom surface of the welding groove. During the process of welding the connection part and the first tab, the slopping surface of the reinforcing rib can be used as a starting welding position to form the first part of the weld mark on the sloping surface, reducing the risk that the connection part is punched through by the welding, due to the high initial welding temperature.

In some embodiments, the reinforcing part is completely accommodated in the welding groove.

In the above technical solution, the reinforcing part is completely accommodated in the welding groove, so that the reinforcing part does not protrude out of the welding groove, and the reinforcing part does not occupy the space outside the battery cell.

In some embodiments, the end cap is provided with a plurality of the reinforcing parts arranged at intervals along an extending direction of the welding groove.

In the above technical solution, each of the plurality of reinforcing parts can reinforce the connection part, so that the connection parts are reinforced at plural positions in the extending direction of the welding groove, which further improves the strength of the connection part.

In some embodiments, the welding groove is an annular groove extending along a circumferential direction of the end cap; and the annular groove has an inner groove surface and an outer groove surface arranged coaxially, and the reinforcing part is connected to the inner groove surface and the outer groove surface.

In the above technical solution, the welding groove is an annular groove extending along the circumferential direction of the end cap, and plural positions of the connection part can be welded in the circumferential direction of the annular groove, which is beneficial to improve the firmness of the connection part and the first tab after welding. In addition, since the reinforcing part is connected to the inner groove surface and the outer groove surface of the welding groove, the firmness of the reinforcing part is improved, and the effect of the reinforcing part reinforcing the connection part is enhanced.

In some embodiments, the end cap comprises: a cap body, configured for connecting with the housing and covering the opening, wherein in a thickness direction of the end cap, the cap body has an outer surface and an inner surface arranged oppositely, and the welding groove is recessed from the outer surface towards the abutting surface; and a convex part or structure, wherein in a thickness direction of the end cap, the convex part protrudes from the inner surface to the electrode assembly, and one end of the convex part away from the inner surface forms the abutting surface.

In the above technical solution, the convex part protrudes from the inner surface of the cap body towards the electrode assembly in the thickness direction of the end cap, and the end of the convex part away from the inner surface of the end cap forms an abutting surface. Such structure is easy to assure the flatness of the abutting surface, such that the abutting surface is in good contact with the first tab, thereby increasing the flow area.

In some embodiments, in a thickness direction of the end cap, a distance between the bottom surface and the abutting surface is less than or equal to a distance between the outer surface and the inner surface.

In the above technical solution, the distance between the bottom surface of the welding groove and the abutting surface of the convex part is less than or equal to the distance between the outer surface of the cap body and the inner surface of the cap body, that is, the thickness of the connection part is less than or equal to the thickness of the cap body, reducing the risk that the welding between the connection part and the first tab is weak due to the connection part being too thick.

In some embodiments, the end cap is provided with a liquid injection hole and a flow guiding channel; the liquid injection hole is configured for allowing electrolyte to enter an interior of the battery cell from outside of the battery cell, and an outer peripheral surface of the convex part is located on an outer periphery of the liquid injection hole; and the flow guiding channel communicates with the liquid injection hole and penetrates an outer peripheral surface of the convex part, and the flow guiding channel is configured for allowing at least part of the electrolyte to flow to outside of the outer peripheral surface.

In the above technical solution, the end cap is provided with a liquid injection hole and a flow guiding channel, the flow guiding channel is communicated with the liquid injection hole and passes through the outer peripheral surface of the convex part. During the process of injecting electrolyte into the interior of the battery cell through the liquid injection hole, the electrolyte can flow laterally to outside of the outer peripheral surface of the convex part through the flow guiding channel, which can effectively improve the liquid injection efficiency and make the electrolyte fully and quickly infiltrate the electrode sheets in the electrode assembly.

In some embodiments, the flow guiding channel is disposed at a position on the end cap corresponding to the reinforcing part.

In the above technical solution, the flow guiding channel is arranged on the end cap at a position corresponding to the reinforcing part, and the reinforcing part can strengthen the position of the end cap where the flow guiding channel is arranged, and improve the strength of the end cap at the position which the flow guiding channel is provided at.

In some embodiments, the flow guiding channel is a flow guiding groove arranged on the abutting surface.

In the above technical solution, the flow guiding channel is a flow guiding groove disposed on the abutting surface, which is convenient for forming of the flow guiding channel. Since the abutting surface faces the electrode assembly, the flow guiding groove is arranged on the abutting surface, so that the side of the flow guiding groove facing the electrode assembly is open, and during the process that the electrolyte laterally flows through the flow guiding channel, a part of the electrolyte can flows toward the interior of the electrode assembly along the direction towards the electrode assembly, which is beneficial for the electrolyte to infiltrate the electrode sheets.

In some embodiments, the flow guiding groove has a first groove wall and a second groove wall opposite to each other; and the reinforcing part comprises a first sloping surface and a second sloping surface opposing to each other, the first sloping surface and the second sloping surface are configured in such a way that a dimension of the reinforcing part in an extending direction of the welding groove gradually decreases from one end of the reinforcing part facing the bottom surface to one end of the reinforcing part away from the bottom surface, the first sloping surface is parallel to the first groove wall, and the second sloping surface is parallel to the second groove wall.

In the above technical solution, the first sloping surface of the reinforcing part is parallel to the first groove wall of the flow guiding groove, and the second sloping surface of the reinforcing part is parallel to the second groove wall of the flow guiding groove, so that the wall thicknesses of individual portions of the reinforcing part are uniform, without mutation generated, so as to enhance the ability of the reinforcing part strengthening the connection part.

In some embodiments, the end cap is provided with a concave part, the welding groove is located on an outer periphery of the concave part, the concave part is recessed from the abutting surface in a direction away from the electrode assembly, and the flow guiding channel communicates with the liquid injection hole through the concave part.

In the above technical solution, the welding groove is located on the outer periphery of the concave part, so that the welding groove and the concave part do not affect each other. The concave part plays the role of making the flow guiding channel and the liquid injection hole communicated with each other. Since the concave part is recessed from the abutment face in the direction away from the electrode assembly, after the electrolyte enters the concave part through the liquid injection hole, a part of the electrolyte can directly enter the interior of the electrode assembly through the concave part to infiltrate the electrode sheet, and a part of the electrolyte can enter the flow guiding channel through the concave part, and flow laterally inside the flow guiding channel and flow to outside of the outer peripheral surface of the convex part, improving the effect of the electrolyte infiltrating the electrode assembly, and simultaneously increasing the injection efficiency.

In some embodiments, the end cap has a liquid outlet surface located in the concave part, and one end of the liquid injection hole penetrates the liquid outlet surface; and in a thickness direction of the end cap, the liquid outlet surface is farther from the electrode assembly than the abutting surface.

In the above technical solution, the liquid outlet surface is farther away from the electrode assembly than the abutting surface in the thickness direction of the end cap, so that there is a distance between the liquid outlet surface and the electrode assembly, which is convenient for the electrolyte to enter the concave part through the liquid injection hole, which is beneficial to the electrolyte to enter the flow guiding channel through the concave part.

In some embodiments, one end of the flow guiding channel penetrates the outer peripheral surface, and the other end of the flow guiding channel penetrates an inner peripheral surface of the concave part.

In the above technical solution, the two ends of the flow guiding channel penetrate through the outer peripheral surface of the convex part and the inner peripheral surface of the concave part respectively, so that the electrolyte can enter the flow guiding channel from the concave part and flow laterally inside the flow guiding channel.

In some embodiments, the end cap is provided with a plurality of the flow guiding channels, and the plurality of the flow guiding channels are circumferentially distributed at intervals with the liquid injection hole as a center, such that the electrolyte can flow to many different directions through the plurality of flow guiding channels, thereby improving the injection efficiency.

In a second aspect, an embodiment of the present application provides a battery, comprising: the battery cell according to the first aspect; and a box, configured for accommodating the battery cell.

In a third aspect, an embodiment of the present application provides an electrical device, comprising the battery provided by any one of the embodiments of the second aspect.

In a fourth aspect, an embodiment of the present application provides a method of manufacturing a battery cell, the method comprising: providing an electrode assembly having a first tab; providing a housing having an opening; providing an end cap; making the electrode assembly accommodated in the housing; and connecting the end cap to the housing, so that the end cap covers the opening, wherein the end cap has an abutting surface and a welding groove, the abutting surface is configured for abutting against the first tab, the welding groove is recessed from one side of the end cap away from the electrode assembly towards the abutting surface, the end cap forms a connection part between the abutting surface and a bottom surface of the welding groove, and the connection part is configured for being welded with the first tab, the end cap is provided with a reinforcing part, the reinforcing part is protruded from the bottom surface, and the reinforcing part is configured for enhancing a strength of the connection part.

In a fifth aspect, an embodiment of the present application further provides a manufacturing device for a battery cell, the manufacturing device comprising: a first providing device, configured for providing an electrode assembly having a first tab; a second providing device, configured for providing a housing having an opening; a third providing device, configured for providing an end cap; an assembling device, configured for making the electrode assembly accommodated in the housing; and also for connecting the end cap to the housing, so that the end cap covers the opening, wherein the end cap has an abutting surface and a welding groove, the abutting surface is configured for abutting against the first tab, the welding groove is recessed from one side of the end cap away from the electrode assembly towards the abutting surface, the end cap forms a connection part between the abutting surface and a bottom surface of the welding groove, and the connection part is configured for being welded with the first tab, the end cap is provided with a reinforcing part, the reinforcing part is protruded from the bottom surface, and the reinforcing part is configured for enhancing a strength of the connection part.

BRIEF DESCRIPTION OF DRAWINGS

In order to illustrate the technical solutions of the embodiments of the present application more clearly, the drawings needed to be used in the embodiments will be briefly introduced s below. It should be understood that the following drawings only show some of the embodiments of the present application, and therefore should be regarded as a limitation on the scope. For those skilled in the art, other related drawings can also be obtained according to these drawings without any creative efforts.

Figure 1:
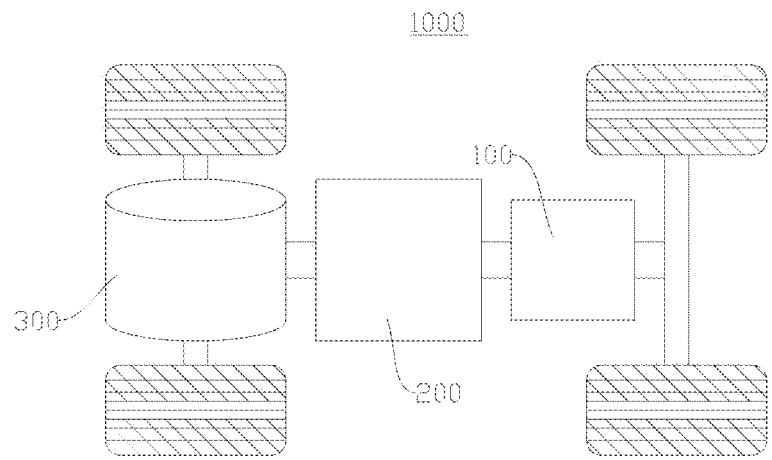
FIG. 1 is a schematic structural diagram of a vehicle provided by some embodiments of the present application.

Reference Numbers: 10—box; 11—accommodating part; 12—covering part; 13—accommodating space; 20—battery cell; 21—housing; 211—opening; 212—first limit part; 213—second limit part; 214—roller groove; 22—electrode assembly; 221—first tab; 222—main body part; 223—second tab; 224—center hole; 23—end cap; 231—abutting surface; 232—welding groove; 2321—bottom surface; 2322—inner groove surface; 2323—outer groove surface; 233—connection part; 234—reinforcing part; 2341—first end; 2342—second end; 2343—sloping surface; 2343a—first sloping surface; 2343b—second sloping surface; 235—cap body; 2351—outer surface; 2352—inner surface; 236—convex part; 2361—outer peripheral surface; 237—liquid injection hole; 238—flow guiding channel; 2381—first groove wall; 2382—second groove wall; 239—concave part; 2391—inner peripheral surface; 240—liquid outlet surface; 25—sealing member; 26—weld mark; 261—first part; 262—second part; 27—blocking member; 100—battery; 200—controller; 300—motor; 1000—vehicle; 2000—manufacturing device; 2100—first supply device; 2200—second providing device; 2300—third providing device; 2400—assembling device; X—extension direction; Z—thickness direction.

DETAILED DESCRIPTION OF EMBODIMENTS

In order to make the purposes, technical solutions and advantages of the embodiments of the present application more clear, the technical solutions in the embodiments of the present application will be clearly described below with reference to the drawings in the embodiments of the present application. Obvious, some, but not all of the embodiments of the present application are described. Based on the embodiments in the present application, all other embodiments, which are obtained by those skilled in the art without creative work, fall within the protection scope of the present application.

Unless defined otherwise, all technical and scientific terms used in the present application have the same meaning as commonly understood by those skilled in the technical field of the present application. In the present application, the terms used in the specification of the present application are only for describing embodiments, not intended to limit the present application. The terms "comprising" and "having" and any variations thereof in the description and claims of the present application and the above description of the drawings are intended to cover non-exclusive inclusion. The terms "first", "second" and the like in the description and claims of the present application or the above drawings are used to distinguish different objects, rather than to describe a specific order or the primary and secondary relationship.

The "embodiment" mentioned in the present application means that a particular feature, structure, or characteristic, which is described in connection with the embodiment, can be included in at least one embodiment of the present application. The appearances of the term in various places in the specification do not necessarily refer to a same embodiment, or a separate or alternative embodiment that is mutually exclusive of other embodiments.

In the description of the present application, it should be noted that, unless expressly specified and limited otherwise, the terms, "installed", "connected with", "connected to" and "attached" should be understood in a broad sense. For example, it may be a fixed connection, or a detachable connection, or an integral connection. It can be directly connected, or indirectly connected through an intermediate medium, and it can be internally communicated between two components. For those skilled in the art, the specific meanings of the above terms in the present application can be understood according to specific situations.

In the embodiments of the present application, the same reference numeral denote the same component. For the sake of brevity, detailed description of the same component is omitted in different embodiments. It should be understood that the thickness, length, width and other dimensions of various components of the embodiments of the present application shown in the drawings, as well as the overall thickness, length and width, etc. of the integrated device are only exemplarily described, and should not constitute any limitation to the present application.

The appearance of "plurality" in the present application refers to two or more (including two).

In the present application, the battery cells may comprise lithium-ion secondary batteries, lithium-ion primary batteries, lithium-sulfur batteries, sodium-lithium-ion batteries, sodium-ion batteries, or magnesium-ion batteries, etc., which are not limited in the embodiments of the present application. The battery cell may be in the form of a cylinder, a flat body, a cuboid, or other shapes, which are not limited in the embodiments of the present application. The battery cells are generally divided into three types according to the packaging method: a cylindrical battery cell, a square battery cell, and a soft-pack battery cell, which are not limited in the embodiments of the present application.

The battery mentioned in the embodiments of the present application refers to a single physical module including one or more battery cells to provide higher voltage and capacity. For example, the battery mentioned in the present application may comprise battery modules or battery packs, and the like. The battery typically comprises a box for enclosing one or more battery cells. The box can prevent liquids or other foreign objects from affecting the charging or discharging of the battery cells.

The battery cell comprises an electrode assembly and electrolyte, and the electrode assembly is composed of a positive electrode sheet, a negative electrode sheet and a separator. The battery cell works mainly relying on the movement of metal ions between the positive electrode sheet and the negative electrode sheet. The positive electrode sheet comprises a positive electrode current collector and a positive electrode active material layer, the positive electrode active material layer is coated on the surface of the positive electrode current collector, and the positive electrode current collector without being coated with the positive electrode active material layer protrudes from the positive electrode current collector coated with the positive electrode active material layer. With a lithium-ion battery as an example, the material of the positive electrode current collector can be aluminum, and the positive electrode active material can be lithium cobalt oxide, lithium iron phosphate, ternary lithium, or lithium manganite, etc. The negative electrode sheet includes a negative electrode current collector and a negative electrode active material layer, and the negative electrode active material layer is coated on the surface of the negative electrode current collector. The negative electrode current collector not coated with the negative electrode active material layer protrudes from the negative electrode current collector coated with the negative electrode active material layer. The negative electrode current collector not coated with the negative electrode active material layer is used as the negative electrode tab. The material of the negative electrode current collector can be copper, and the negative electrode active material can be carbon or silicon, etc. In order to ensure that a large current is passed without fusing, the number of positive tabs is plural and stacked together, and the number of negative electrode tabs is plural and stacked together. The material of the separator can be PP (polypropylene) or PE (polyethylene), and the like. In addition, the electrode assembly may be of a wound structure or a laminated structure, and the embodiment of the present application is not limited thereto.

For a common battery cell, the end cap needs to be welded with the tab of the electrode assembly to realize the electrical connection between the end cap and the tab, so that the end cap acts as the output pole (positive output pole or negative output pole) of the battery cell. The inventor found that, in order to ensure the firmness of the end cap and the tab after welding, the part of the end cap, which is welded with the tab, was relatively weak. When the external pressure is too large or the internal pressure of the battery cell is too large, the part of the end cap, which is welded with the tab, is easy to be damaged, affecting the service life of the battery cell.

In view of this, an embodiment of the present application provides a technical solution, wherein the end cap has an abutting surface and a welding groove, the abutting surface is configured for abutting against the first tab, and the welding groove is recessed from the side of the end cap away from the electrode assembly to the abutting surface. The end cap forms a connection part or connector between the abutting surface and the bottom surface of the welding groove, the connection part is configured for being welded with the first tab, the end cap is provided with a reinforcing part or structure protruding from the bottom surface of the welding groove, and the reinforcing part plays a role of strengthening the connection part configured for being welded with the first tab, so as to improve the strength of the connection part, reduce the risk that the battery cell is failure due to the damage of the connection part under pressure, and effectively improve the service life of the battery cell.

The technical solutions described in the embodiments of the present application are applicable to battery cells, batteries, and electrical device using batteries.

The electrical devices can be vehicles, mobile phones, portable devices, notebook computers, ships, spacecraft, electric toys and power tools, and so on. The vehicles can be fuel vehicles, gas vehicles or new energy vehicles, and the new energy vehicles can be pure electric vehicles, hybrid vehicles or extended-range vehicles, etc.; the spacecraft comprise airplanes, rockets, space shuttles, spacecraft, etc.; the electric toys comprise electric toys of fixed type or mobile type, such as game consoles, electric car toys, electric ship toys and electric airplane toys, etc.; the electric tools comprise metal cutting electric tools, grinding electric tools, assembling electric tools and railway electric tools, such as, electric drills, electric grinders, electric wrenches, electric screwdrivers, electric hammers, electric impact drills, concrete vibrators and electric planers, etc. The embodiments of the present application do not impose special limitations on the above-mentioned electrical device.

In the following embodiments, for the convenience of description, the electric device is a vehicle, as an example for description.

Referring to FIG. 1, it is a schematic structural diagram of a vehicle 1000 provided by some embodiments of the present application. A battery 100 is disposed inside the vehicle 1000, and the battery 100 may be disposed at the bottom, head or tail of the vehicle 1000. The battery 100 may be configured for supplying power to the vehicle 1000, for example, the battery 100 may be used as an operating power source for the vehicle 1000.

The vehicle 1000 may also comprise a controller 200 and a motor 300, and the controller 200 is used for controlling the battery 100 to supply power to the motor 300, e.g., for the work power requirements during starting, navigating, and driving the vehicle 1000.

In some embodiments of the present application, the battery 100 can be used as not only the operating power source of the vehicle 1000, but also the driving power source of the vehicle 1000 to provide driving power for the vehicle 1000, replacing or partially replacing fuel or natural gas.

Figure 2:
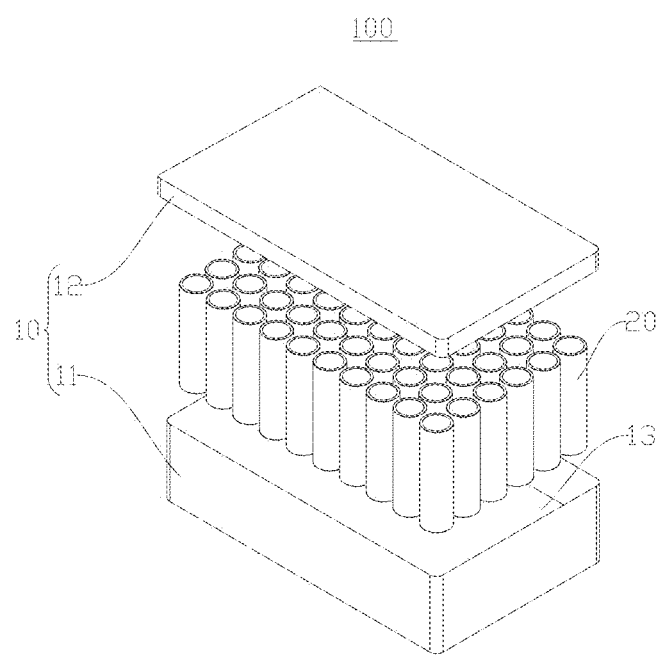
FIG. 2 is a schematic structural diagram of a battery provided by some embodiments of the present application.

In some embodiments, referring to FIG. 2, it is a schematic structural diagram of a battery 100 provided by some embodiments of the present application. The battery 100 comprises a box 10 and a battery cell 20, and the box 10 is configured to accommodate the battery cell 20.

The box 10 may comprise an accommodating part or structure 11 and a covering part or structure 12, and the covering part 12 covers the accommodating part 11 to define a accommodating space 13 for receiving the battery cell 20. The accommodating part 11 and the covering part 12 may be in various shapes, such as a cuboid, a cylinder, and the like. The accommodating part 11 can be of a hollow structure with one side open, and the covering part 12 can also be of a hollow structure with one side open. The open side of the covering part 12 covers the open side of the accommodating part 11 to form the box 10 with the accommodating cavity. As shown in FIG. 2, it is also possible that the accommodating part 11 can be of a hollow structure with one side open, the covering part 12 is of a plate-like structure, and the covering part 12 covers the open side of the accommodating part 11 to form a box with an accommodating cavity 10.

Herein, the accommodating part 11 and the covering part 12 can be sealed by a sealing element, and the sealing element can be a sealing ring, a sealant or the like.

In the battery 100, there may be one battery cell 20 or a plurality of battery cells 20. If a plurality of battery cells 20 are provided, the plurality of battery cells 20 may be connected in series or in parallel or in a mixed connection. A mixed connection means that some of the plurality of battery cells 20 are connected in series and the remaining are in parallel. A plurality of battery cells 20 may firstly be connected in series or in parallel or in mixed connection to form a battery module, and then a plurality of battery modules may be connected in series or in parallel or in mixed connection to form a whole, which is accommodated in the box 10. It is also possible that all the battery cells 20 are directly connected in series, in parallel or in a mixed connection, and then the whole formed by all the battery cells 20 is accommodated in the box 10.

In some embodiments, the battery 100 may further comprise a bus component, and the plurality of battery cells 20 may be electrically connected through the bus component, so as to realize the series, parallel or mixed connection of the plurality of battery cells 20.

The bus component may be a metal conductor, such as, copper, iron, aluminum, stainless steel, aluminum alloys, and the like.

Figure 3:
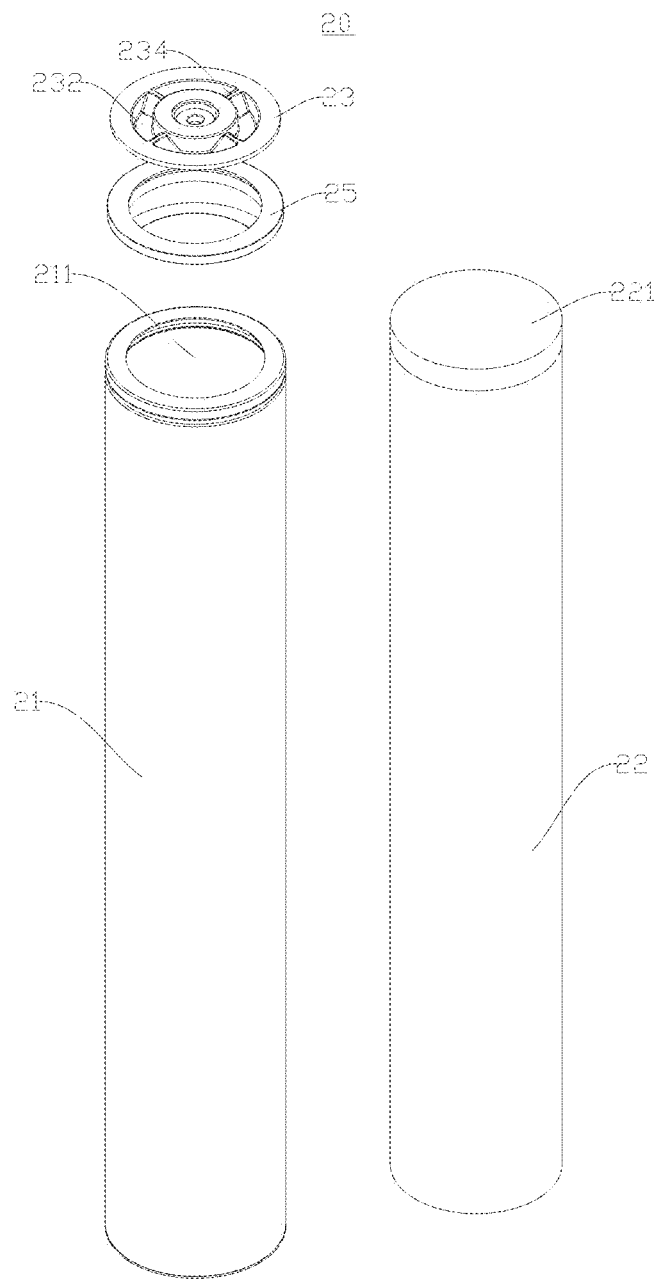
FIG. 3 is an exploded view of a battery cell provided by some embodiments of the present application.

Referring to FIG. 3, it is an exploded view of a battery cell 20 provided by some embodiments of the present application. The battery cell 20 comprises a housing 21, an electrode assembly 22 and an end cap 23. The housing 21 has an opening 211 and the housing 21 is configured to accommodate the electrode assembly 22, the electrode assembly 22 has a first tab 221, the end cap 23 is configured to connect with the housing 21 and cover the opening 211, and the end cap 23 is configured to be welded with the first tab 221 to realize that the end cap 23 is electrically connected to the first tab 221.

The end cap 23 is electrically connected to the first tab 221, the end cap 23 can be used as an output pole (positive output pole or negative output pole) of the battery cell 20, and the output pole is the portion of the battery cell 20, which is connected with other components and outputs electrical energy of the battery cell 20. In the case where the battery 100 comprises a plurality of battery cells 20 and the plurality of battery cells 20 can be electrically connected through a bus component, the end cap 23 of the battery cell 20 can be connected to the bus component to output electrical energy of the battery cell 20.

In some embodiments, continuously referring to FIG. 3, the battery cell 20 may further comprise a sealing member 25, and the end cap 23 and the housing 21 are sealingly connected by the sealing member 25, so that the end cap 23 and the housing 21 together form a sealing space for accommodating the electrode assembly 22 and the electrolyte.

The sealing member 25 may be of material, such as plastic, rubber, or the like.

In the embodiment of the present application, the housing 21 is configured to accommodate the electrode assembly 22, and the housing 21 may be in various shapes, for example, a cylinder, a cuboid, and the like. The shape of the housing 21 may be determined according to the specific shape of the electrode assembly 22. For example, if the electrode assembly 22 is of a cylindrical structure, the housing 21 can selectively is of a cylindrical structure; and if the electrode assembly 22 is of a cuboid structure, the housing 21 can selectively is of a cuboid structure. Exemplarily, in FIG. 3, the housing 21 is a hollow cylindrical structure with one end open, and an opening 211 is formed at the open end of the housing 21.

The housing 21 may be made of metal material, such as copper, iron, aluminum, steel, aluminum alloy, and the like.

Figure 4:
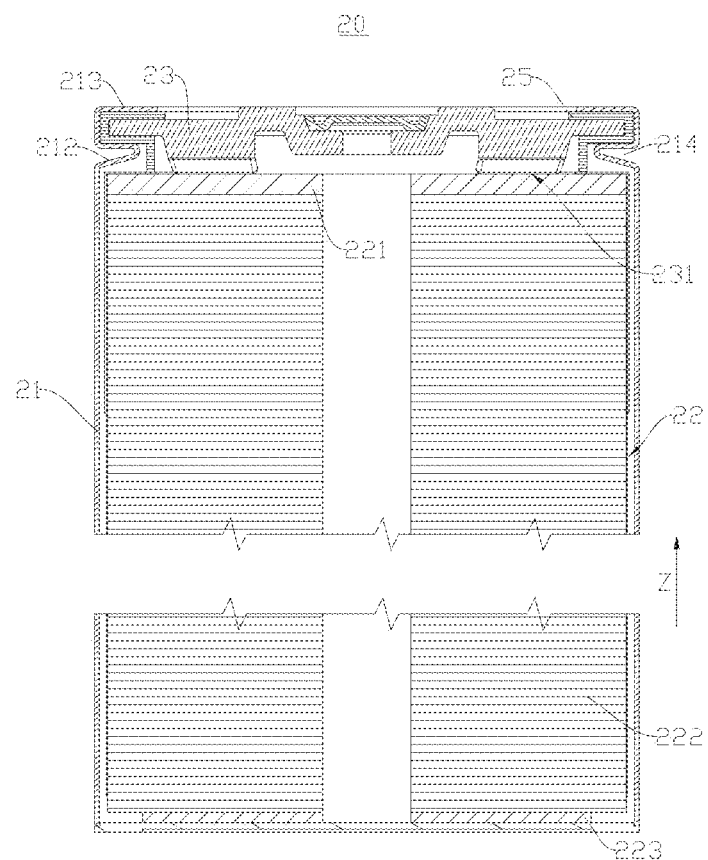
FIG. 4 is a sectional view of the battery cell shown in FIG. 3.

In some embodiments, referring to FIG. 4, it is a sectional view of the battery cell 20 shown in FIG. 3. The housing 21 is form with a first limit part 212 and a second limit part 213. The first limit part 212 is configured to limit the movement of the end cap 23 in the direction facing the electrode assembly 22 to reduce the risk that the end cap 23 moves towards the interior of the housing 21 to squeeze the electrode assembly 22. The second limit part 213 is configured to limit the movement of the end cap 23 in a direction away from the electrode assembly 22, so as to limit the end cap 23 from being separated from the housing 21. Under the combined limitations of the first limit part 212 and the second limit part 213, the end cap 23 cannot move relative to the housing 21 in the thickness direction Z of the end cap 23.

Both the first limit part 212 and the second limit part 213 may be of an annular structure extending along the circumferential direction of the opening 211 of the housing 21.

In the case where the end cap 23 and the housing 21 are sealingly connected by the sealing member 25, the second limit part 213 can press a part of the sealing member 25 against the end cap 23, and the end cap 23 can press a part of the sealing member 25 against the first limit part 212, to realize the sealing connection between the end cap 23 and the housing 21.

Exemplarily, a roller groove 214 is provided on the outer side surface of the housing 21, and a first limit part 212 is formed on the inner side surface of the housing 21 at a position corresponding to the roller groove 214, so that the housing 21 forms a necking structure at the position at which the first limit part 212 is formed.

In the actual production process, the roller groove 214 can be formed on the outer side surface of the housing 21 by means of rolling, and the first limit part 212 is naturally formed on the inner side surface of the housing 21.

Exemplarily, the second limit part 213 may be a flanging structure formed at the position of the opening 211, which is formed by partially folding the housing 21 inward.

In the process of assembling the battery cell 20, the electrode assembly 22 can be accommodated in the housing 21 first, and then the end cap 23 is made to cover one end of the housing 21, and the end cap 23, under a restricting effect on the first limit part 212, cannot move to the interior of the housing 21, and finally the housing 21 is partially folded inward to form the second limit part 213, so as to fix the end cap 23 to the housing 21.

In some embodiments, the electrode assembly 22 may further comprise a main body part 222 and a second tab 223. The polarities of the first tab 221 and the second tab 223 are opposite to each other, and both the first tab 221 and the second tab 223 are protruded from the main body part 222, and the second tab 223 is configured for being electrically connected with the housing 21.

Exemplarily, the first tab 221 and the second tab 223 protrude from opposite two ends of the main body part 222 in the thickness direction Z of the end cap 23, respectively, and the second tab 223 is welded to the housing 21, so as to realize that the second tab 223 is electrically connected with the housing 21.

The polarities of the first tab 221 and the second tab 223 are opposite to each other. It is understandable that if the first tab 221 is a positive electrode tab, the second tab 223 is a negative electrode tab, and if the first tab 221 is a negative electrode tab, the second tab 223 is the positive electrode tab.

Since the first tab 221 is electrically connected to the end cap 23 and the second tab 223 is electrically connected to the housing 21, in order to reduce the risk of the short circuit between the positive and negative electrodes caused by the contact between the end cap 23 and the housing 21, the end cap 23 can be connected to the end cap 23 in insulation manner. In the case where the end cap 23 and the housing 21 are sealed by the sealing member 25, the end cap 23 and the housing 21 can also be insulated by the sealing member 25, that is, the sealing member 25, located between the end cap 23 and the housing 21, plays both a sealing role and an insulating role.

The main body part 222 may comprise a positive electrode sheet, a negative electrode sheet and a separator. The main body part 222 may be a rolled-type structure which is formed by winding a positive electrode sheet, a separator and a negative electrode sheet. The main body part 222 may also be a stacked-type structure which is formed by stacking the positive electrode sheet, the separator and the negative electrode sheet.

The positive electrode sheet comprises a positive electrode current collector and positive electrode active material layers coated on opposite sides of the positive electrode current collector. The negative electrode sheet comprises a negative electrode current collector and negative electrode active material layers coated on opposite sides of the negative electrode current collector. The main body part 222 may be the portion of the electrode assembly 22 corresponding to the area of the electrode sheet that is coated with the active material layer. The tab may be the portion of the electrode assembly 22 corresponding to the area of the electrode sheet that is not coated with the active material layer. It is understandable that the positive electrode tab may be the area on the positive electrode sheet that is not coated with the positive active material layer, and the negative electrode tab may be the area on the negative electrode sheet that is not coated with the negative electrode active material layer.

In some embodiments, the end cap 23 and the second limit part 213 of the housing 21 are respectively used as two output poles of the battery cell 20. It is possible that the end cap 23 is used as the positive output pole of the battery cell 20, and the second limit part 213 can be used as the negative output pole of the battery cell 20; or it is possible that the end cap 23 is used as the negative output pole of the battery cell 20, and the second limit part 213 is used as the positive output electrode of the battery cell 20.

As an example in which the two battery cells 20 are electrically connected through the bus component to realize the series connection of the two battery cells 20, the second limit part 213 of one battery cell 20 and the end cap 23 of the other battery cell 20 are both connected to the same bus component, e.g., by welding.

Figure 5:
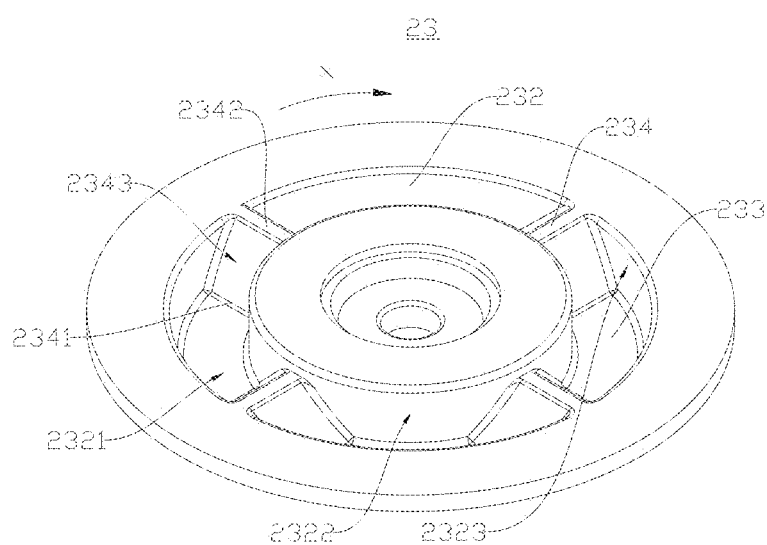
FIG. 5 is a front axonometric view of the end cap shown in FIG. 4.

In the embodiment of the present application, referring to FIG. 4 and FIG. 5, FIG. 5 is a front axonometric view of the end cap 23 shown in FIG. 4. The end cap 23 has an abutting surface 231 and a welding groove 232, and the abutting surface 231 is used for abutting against the first tab 221. The welding groove 232 is recessed from the side of the end cap 23 away from the electrode assembly 22 toward the abutting surface 231. The end cap 23 forms a connecting part 233 between the abutting surface 231 and the bottom surface 2321 of the welding groove 232. The connection part 233 is used for being welded with the first tab 221, wherein the end cap 23 is provided with a reinforcing part 234, the reinforcing part 234 is protruded from the bottom surface 2321 of the welding groove 232, and the reinforcing part 234 is used to enhance the strength of the connecting portion 233.

The end cap 23 is provided with a reinforcing part 234 protruding from the bottom surface 2321 of the welding groove 232. The reinforcing part 234 can strengthen the connection part 233 for being welded with the first tab 221, thereby increasing the strength of the connection part 233, reducing the risk of failure of the battery cell 20 due to the damage of the connection part 233, and effectively enhancing the service life of the battery cell 20.

It should be noted that a connection part 233 is formed between the abutting surface 231 of the end cap 23 and the bottom surface 2321 of the welding groove 232. It is understood that the part of the end cap 23, which has a thickness, between the abutting surface 231 and the bottom surface 2321 of the welding groove 232, is the connection part 233, and the thickness of the connection part 233 is the distance between the abutting surface 231 and the bottom surface 2321 of the welding groove 232.

The reinforcing part 234 acts to reinforce the connection part 233, and the reinforcing part 234 is connected to the groove side surface of the welding groove 232. The reinforcing part 234 and the connection part 233 may be of an integrally formed structure or a separate structure. For example, the reinforcing part 234 and the connection part 233 are of a separate structure, and the reinforcing part 234 is connected to the bottom surface 2321 of the welding groove 232 and the groove side surface of the welding groove 232 by bonding or welding.

The reinforcing part 234 is protruded from the bottom surface 2321 of the welding groove 232, that is, the reinforcing part 234 is at least partially located in the welding groove 232. Of course, the reinforcing part 234 may be partially located in the welding groove 232, or it may be completely located in the welding groove 232.

Exemplarily, in FIG. 4 and FIG. 5, the reinforcing part 234 is completely located in the welding groove 232, so that the reinforcing part 234 does not protrude out of the welding groove 232, and the reinforcing part 234 does not occupy the space outside the battery cell 20.

In some embodiments, the welding groove 232 is an annular groove extending along the circumferential direction of the end cap 23. The annular groove has an inner groove surface 2322 and an outer groove surface 2323 arranged coaxially, and the reinforcing part 234 is connected to the inner groove surface 2322 and the outer groove surface 2323.

Since the welding groove 232 is an annular groove extending along the circumferential direction of the end cap 23, the connection part 233 can be welded at plural positions, in the circumferential direction of the annular groove, which is beneficial to improve the firmness between the connection part 233 and the first tab 221 after welding. In addition, since the reinforcing part 234 is connected to the inner groove surface 2322 and the outer groove surface 2323 of the welding groove 232, the firmness of the reinforcing part 234 is improved, and the reinforcing effect of the reinforcing part 234 on the connection part 233 is enhanced.

In other embodiments, the welding groove 232 may also of other shapes, for example, the welding groove 232 is a strip-shaped groove extending perpendicularly to the thickness direction Z of the end cap 23.

In the embodiment of the present application, the reinforcing part 234 on the end cap 23 that plays a role of reinforcing the connection part 233 may be one or plural.

In some embodiments, the end cap 23 is provided with a plurality of reinforcing parts 234 at intervals along the extending direction X of the welding groove 232, and the plurality of reinforcing parts 234 can each strengthen the connection part 233, so that the connection parts 233 are reinforced at plural positions in the extending direction X of the welding groove 232, which further improves the strength of the connection part 233.

In the case that the welding groove 232 is an annular groove extending along the circumferential direction of the end cap 23, the extending direction X of the welding groove 232 is the circumferential direction of the welding groove 232, and the plurality of reinforcing parts 234 are circumferentially distributed in the welding groove 232.

Optionally, the plurality of reinforcing parts 234 are circumferentially and evenly distributed in the welding groove 232.

Exemplarily, in FIG. 5, the end cap 23 is provided with four reinforcing parts 234, and the four reinforcing parts 234 are circumferentially and evenly distributed in the welding groove 232.

Figure 6:
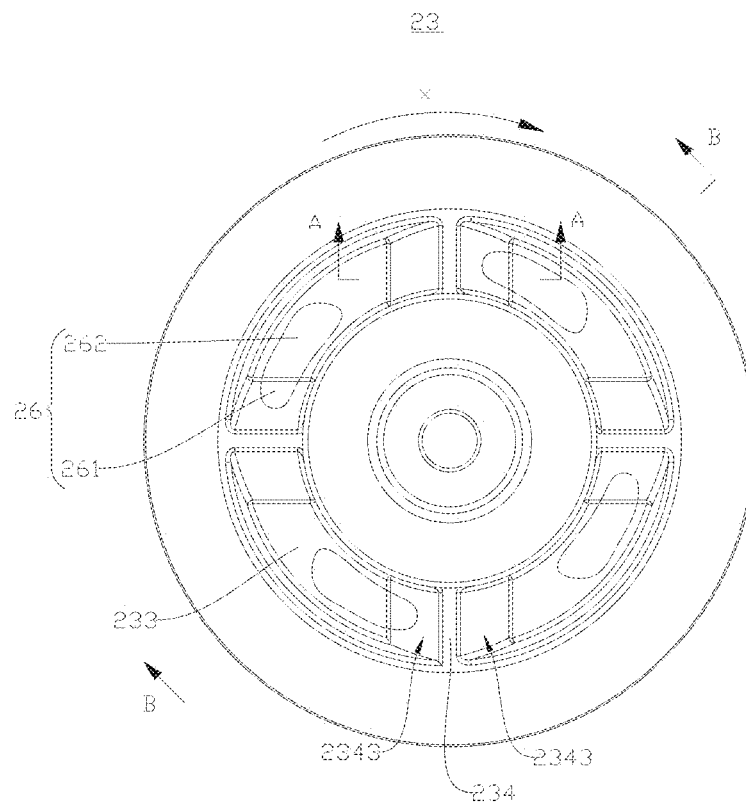
FIG. 6 is a top view of the end cap shown in FIG. 4.

In some embodiments, referring to FIG. 6, FIG. 6 is a top view of the end cap 23 shown in FIG. 4. The connection part 233 and the first tab 221 are welded to form a weld mark 26. The weld mark 26 comprises a first part 261 and the second part 262 continuously arranged. The first part 261 is formed on the reinforcing part 234, and the second part 262 is formed on the connection part 233, which can reduce the risk that the connection part 233 is punched through by welding due to the high initial welding temperature.

In the actual welding process, the welding can be started from the reinforcing part 234, so that the first part 261 is formed on the reinforcing part 234, and then the connection part 233 and the tab are welded to form the second part 262 on the reinforcing part. Since the welding is started at the reinforcing part, the overall thickness of the end cap 23 at the position of the reinforcing part 234 is relatively large, which can withstand higher welding temperatures. Even if the initial welding temperature is relatively high, the end cap 23 is not easily punched through by welding.

The second part 262 of the weld mark 26 is formed on the connection part 233 to realize the welding of the connection part 233 and the first tab 221. The first part 261 of the weld mark 26 is formed on the reinforcing part 234. If the welding depth corresponding to the first part 261 is small, the reinforcing part 234 and the first tab 221 are not welded together. If the welding depth corresponding to the first part 261 is relatively large, the reinforcing part 234 and the first tab 221 are welded together.

In some embodiments, referring to FIG. 5 and FIG. 6, in the thickness direction Z of the end cap 23, the reinforcing part 234 has a first end 2341 and a second end 2342 arranged oppositely, and the first end 2341 is connected to the bottom surface of 2321 of the welding groove 232. The dimension of the reinforcing part 234 in the extending direction X of the welding groove 232 (the width of the reinforcing part 234) gradually decreases from the first end 2341 to the second end 2342, so that at least one side of the reinforcing part 234 in the extending direction X of the welding groove 232 is provided with a sloping surface 2343, the sloping surface 2343 is connected to the bottom surface 2321 of the welding groove 232, and the first part 261 is formed on the sloping surface 2343.

Since the dimension of the reinforcing part 234 in the extending direction X of the welding groove 232 gradually decreases from the first end 2341 of the reinforcing part 234, that is connected to the bottom surface 2321, to the second end 2342 of the reinforcing part 234, which faces away from the bottom surface 2321, so that the reinforcing part 234 is of a structure with the thickness gradient, which saves materials while ensuring that the reinforcing part 234 has better reinforcing ability. In addition, since the reinforcing part 234 is of a structure with gradient thickness, at least one side of the reinforcing part 234 in the extending direction X of the welding groove 232 forms a sloping surface 2343 connected to the bottom surface 2321 of the welding groove 232. During welding the connection part 223 with the first tab 221, the sloping surface 2343 of the reinforcing rib can be used as the initial welding position to form the first part 261 of the weld mark 26 on the sloping surface 2343. After the welding temperature is decreased, the welding is performed on the connection part 223 and the first tab 221, so as to reduce the risk that the connection part 233 is punched through by welding, due to the high initial welding temperature.

Exemplarily, in FIGS. 5 and 6, sloping surfaces 2343 are formed on both sides of the reinforcing part 234 in the extending direction X of the welding groove 232, that is, the reinforcing part 234 has two sloping surfaces 2343. It is possible to use one sloping surface 2343 of the reinforcing part 234 as the starting position for welding, or both sloping surfaces 2343 of the reinforcing part 234 as the starting positions for welding.

Figure 7:
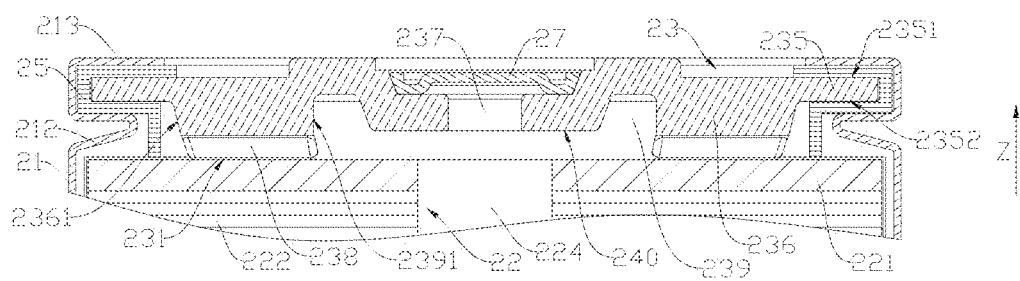
FIG. 7 is a partial view of the battery cell shown in FIG. 4.

Referring to FIG. 7, it is a partial view of the battery cell 20 shown in FIG. 4. The end cap 23 may comprise a cap body 235 and a convex part 236. The cap body 235 is configured to connect with the housing 21 and cover the opening 211. In the thickness direction Z of the end cap 23, the cap body 235 has an outer surface 2351 and an inner surface 2352 arranged oppositely. The welding groove 232 is recessed from the outer surface 2351 towards the abutting surface 231. The convex part 236 is in the thickness direction Z of the end cap 23. The convex part 236 protrudes from the inner surface 2352 towards the electrode assembly 22. One end of the convex part 236 away from the inner surface 2352 forms the abutting surface 231. This structure can easily ensure the flatness of the abutting surface 231, so that the abutting surface 231 and the first tab 221 are kept in good contact, thereby increasing the flow area.

Exemplarily, the cap body 235 is sealingly connected to the housing 21 through the sealing member 25. In the thickness direction Z of the end cap 23, the first limit part 212 is located on the side of the cap body 235 facing the electrode assembly 22, and the second limit part 213 is located on the side of the cap body 235 away from the electrode assembly 22. The first limit part 212 and the second limit part 213 cooperate with each other to limit the movement of the cap body 235 relative to the housing 21 along the thickness direction Z of the end cap 23.

In some embodiments, the end cap 23 is provided with a liquid injection hole 237 and a flow guiding channel 238. The liquid injection hole 237 is configured for allowing the electrolyte to enter the interior of the battery cell 20 from the outside of the battery cell 20, and the outer peripheral surface 2361 of the convex part 236 is located on the outer periphery of the liquid injection hole 237. The flow guiding channel 238 communicates with the liquid injection hole 237 and penetrates the outer peripheral surface 2361 of the convex part 236. The flow guiding channel 238 is used for allowing at least part of the electrolyte to flow to outside of the outer peripheral surface 2361.

During the process of injecting the electrolyte into the battery cell 20 through the injection hole 237, the electrolyte can flow laterally through the flow guiding channel 238 and flow to outside of the outer peripheral surface 2361 of the convex part 236, which can effectively improve the injection efficiency and make the electrolysis sufficiently and rapidly infiltrate the electrode sheets in the electrode assembly 22.

As an example in which the welding groove 232 is an annular groove, the liquid injection hole 237 may be disposed coaxially with the welding groove 232. The liquid injection hole 237 may also be arranged coaxially with the central hole 224 of the electrode assembly 22.

The number of flow guiding channels 238 on the end cap 23 may be one or plural. In some embodiments, the end cap 23 is provided with a plurality of flow guiding channels 238, and the flow guiding channels 238 are circumferentially distributed at intervals with the liquid injection hole 237 as the center, so that the electrolyte can flow, through the plurality of flow guiding channels 238, towards a plurality of different directions, thereby improving the injection efficiency.

In some embodiments, the battery cell 20 may further comprise a blocking member 27, and the blocking member 27 is configured to block the liquid injection hole 237. After the electrolyte is injected into the battery 100, the liquid injection hole 237 can be blocked by the blocking member 27 to prevent the electrolyte from leaking from the liquid injection hole 237.

In the embodiment of the present application, the flow guiding channel 238 communicates with the liquid injection hole 237, which may be the direct communication between the flow guiding channel 238 and the liquid injection hole 237, or the indirect communication between the flow guiding channel 238 and the liquid injection hole 237.

In some embodiments, the flow guiding channel 238 is indirectly connected with the liquid injection hole 237. Specifically, the end cap 23 is provided with a concave part or structure 239, the welding groove 232 is located on the outer periphery of the concave part 239, the concave part 239 is recessed from the abutting surface 231 towards the direction away from the electrode assembly 22, and the flow guiding channel 238 communicates with the liquid injection hole 237 through the concave part 239.

Since the welding groove 232 is located on the outer periphery of the concave part 239, the welding groove 232 and the concave part 239 do not affect each other. The concave part 239 plays the role of making the flow guiding channel 238 and the liquid injection hole 237 communicated with each other. Since the concave part 239 is recessed from the abutting surface 231 towards the direction away from the electrode assembly 22, after the electrolyte enters the concave part 239 through the liquid injection hole 237, a part of the electrolyte can directly enter the interior of the electrode assembly 22 through the concave part 239 to infiltrate the electrode sheet, and a part of the electrolyte can enter the flow guiding channel 238 through the concave part 239 and flow laterally inside the flow guiding channel 238 to outside of the outer peripheral surface 2361 of the convex part 236, improving the liquid injection efficiency, at the same increasing the infiltration effect of the electrolyte on the electrode assembly 22.

Exemplarily, the concave part 239 is disposed coaxially with the liquid injection hole 237.

Optionally, one end of the flow guiding channel 238 penetrates the outer peripheral surface 2361 of the convex part 236, and the other end of the flow guiding channel 238 penetrates the inner peripheral surface 2391 of the concave part 239, so that the electrolyte can enter the flow guiding channel 238 from the concave part 239, and flows laterally in the flow guiding channel 238.

Exemplarily, the flow guiding channel 238 may extend along the radial direction of the liquid injection hole 237.

In some embodiments, the end cap 23 has a liquid outlet surface 240 located in the concave part 239, and one end of the liquid injection hole 237 penetrates the liquid outlet surface 240. In the thickness direction Z of the end cap 23, the liquid outlet surface 240 is farther away from the electrode assembly 22 than the abutting surface 231. This structure enables a distance exists between the liquid outlet surface 240 and the electrode assembly 22, which facilitates that the electrolyte enters the concave part 239 from the liquid injection hole 237, and facilitates that the electrolyte enters the flow guiding channel 238 through the concave part 239.

In some embodiments, the flow guiding channel 238 is disposed on the end cap 23 at a position corresponding to the reinforcing part 234. The reinforcing part 234 can strengthen the end cap 23 at the position where the flow guiding channel 238 is arranged, and improve the strength of the position where the flow guiding channel 238 is arranged on the end cap 23.

The flow guiding channels 238 correspond to the reinforcing parts 234 one-to-one. If there is one flow guiding channel 238, there will be one reinforcing part 234, and if there are plural flow guiding channels 238, there will be plural reinforcing parts 234.

Figure 8:
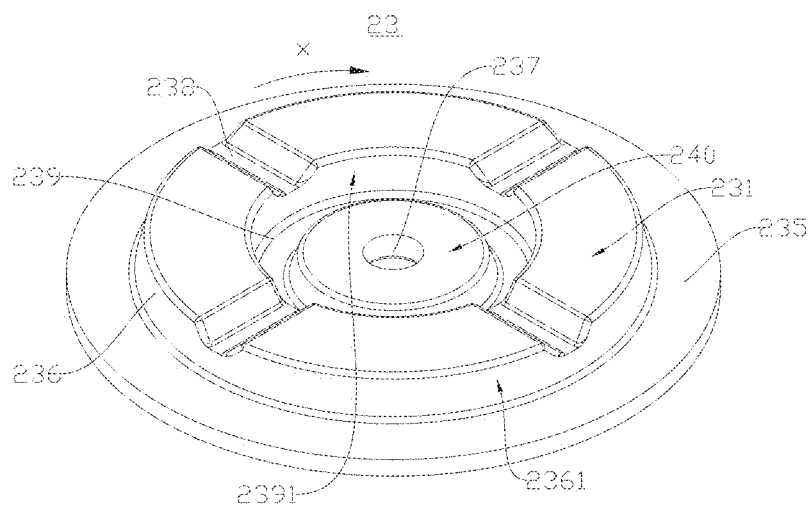
FIG. 8 is a reverse axonometric view of the end cap shown in FIG. 4.

In some embodiments, referring to FIG. 8, FIG. 8 is a reverse axonometric view of the end cap 23 shown in FIG. 4. The flow guiding channel 238 is a flow guiding groove disposed on the abutting surface 231.

In the production process, the guiding grooves can be directly formed, by processing, on the abutting surface 231, to form the guiding channels 238. Under the condition that the flow guiding channel 238 is disposed on the end cap 23 at a position corresponding to the reinforcing part 234, the arrangement of the reinforcing part 234 enables that the flow guiding groove is recessed more deeply, from the abutting surface 231, along the direction away from the electrode assembly 22, which is conducive to the flow of the electrolyte in the flow guiding groove, effectively improving the injection efficiency.

In addition, since the abutting surface 231 faces the electrode assembly 22, the flow guiding groove is provided on the abutting surface 231, so that the side of the flow guiding groove facing the electrode assembly 22 is open, and the electrolyte, during flowing laterally through the flow guiding channel 238, has a part capable of flowing toward the interior of the electrode assembly 22 along the direction facing the electrode assembly 22 (towards the electrode assembly), which is beneficial for the electrolyte to infiltrate the electrode sheet.

Figure 9:
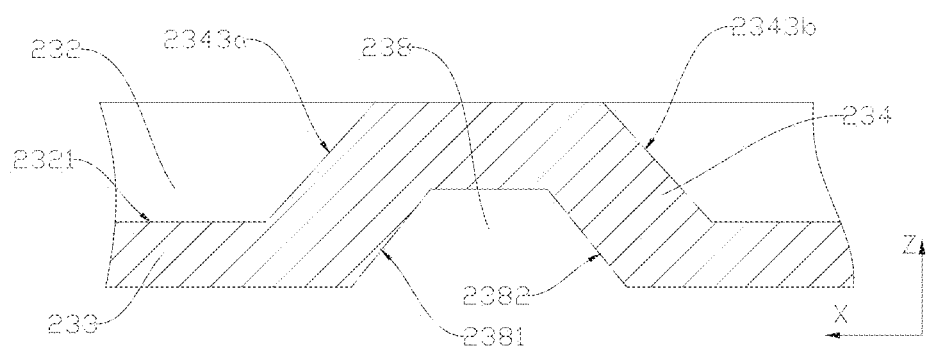
FIG. 9 is a sectional view along A-A of the end cap shown in FIG. 6.

In some embodiments, referring to FIG. 9, FIG. 9 is a sectional view along A-A of the end cap 23 shown in FIG. 6. The flow guiding groove has the first groove wall 2381 and the second groove wall 2382 opposite to each other. The reinforcing part 234 comprises the first and second sloping surfaces 2343a and 2343b opposing to each other. The first and second sloping surfaces 2343a and 2343b are configured in such a way that the dimension of the reinforcing part 234 in the extending direction X of the welding groove 232 gradually decreases from the end of the reinforcing part 234 facing the bottom surface 2321 to the end of the reinforcing part 234 away from the bottom surface 2321. The first sloping surface 2343a is parallel to the first groove wall 2381, and the second sloping surface 2343b is parallel to the second groove wall 2382. This structure makes the wall thicknesses of individual portions of the reinforcing part 234 uniform without sudden change, and enhances the ability of the reinforcing part 234 reinforcing the connection part 233.

It should be noted that the first sloping surface 2343a and the second sloping surface 2343b are the two sloping surfaces 2343 (shown in FIG. 5) of the reinforcing part 234 in the extending direction X of the welding groove 232. The end of the reinforcing part 234 facing the bottom surface 2321 is the first end 2341 of the reinforcing part 234 (shown in FIG. 5), and the end of the reinforcing part 234 away from the bottom surface 2321 is the second end 2342 of the reinforcing part 234 (shown in FIG. 5). That is to say, the first sloping surface 2343a and the second sloping surface 2343b are arranged such that the dimension of the reinforcing part 234 in the extending direction X of the welding groove 232 gradually decrease from the first end 2341 to the second end 2342, which can also be understood in the way that the distance between the first sloping surface 2343a and the second sloping surface 2343b in the extending direction X of the welding groove 232 gradually decreases from the first end 2341 to the second end 2342.

Figure 10:
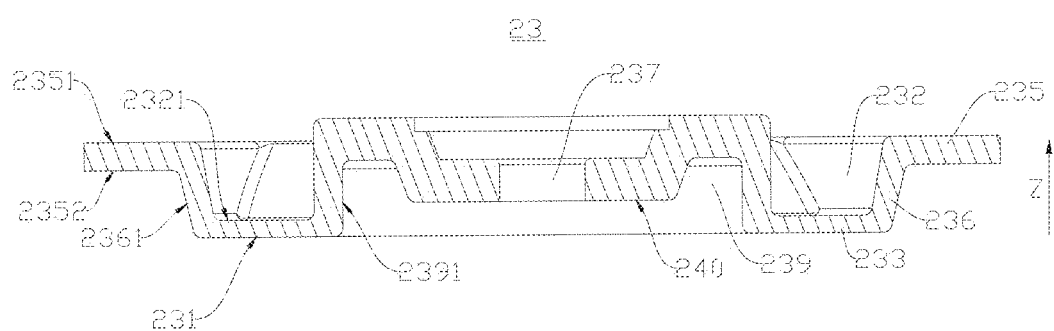
FIG. 10 is a sectional view along B-B of the end cap shown in FIG. 6.

In some embodiments, referring to FIG. 10, it is a sectional view along B-B of the end cap 23 shown in FIG. 6. In the thickness direction Z of the end cap 23, the distance between the abutting surface 231 and the bottom surface 2321 of the welding groove 232 is less than or equal to the distance between the outer surface 2351 of the cap body 235 and the inner surface 2352 of the cap body 235, that is, the thickness of the connection part 233 is less than or equal to the thickness of the cap body 235, which reduces the risk that the welding between the connection part 233 and the first tab 211 is weak due to the connection part being too thick.

Exemplarily, in FIG. 10, the distance between the abutting surface 231 and the bottom surface 2321 of the welding groove 232 is smaller than the distance between the outer surface 2351 of the cap body 235 and the inner surface 2352 of the cap body.

Optionally, the bottom surface 2321 of the welding groove 232 is closer to the abutting surface 231 than the inner surface 2352 of the cap body 235, so that the welding groove 232 is recessed into the convex part 236.

Figure 11:
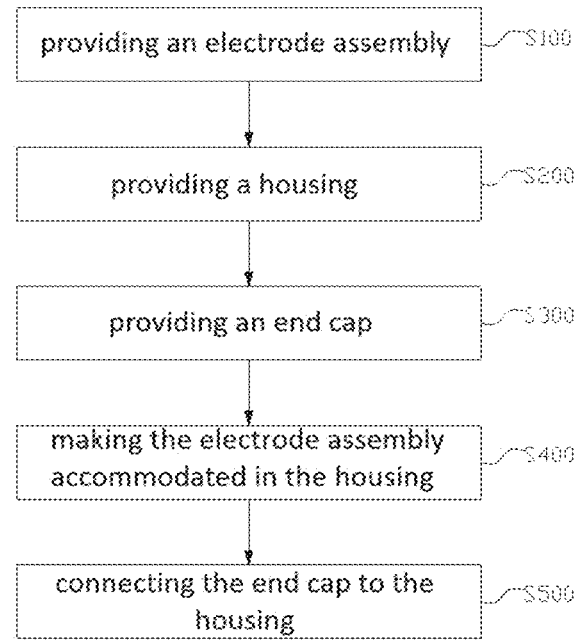
FIG. 11 is a flowchart of a method for manufacturing a battery cell provided by some embodiments of the present application.

Embodiments of the present application provide a method for manufacturing a battery cell 20. Referring to FIG. 11, FIG. 11 is a flowchart of a method for manufacturing the battery cell 20 provided by some embodiments of the present application. The manufacturing method comprises:

S100: providing an electrode assembly 22, the electrode assembly 22 having a first tab 221;

S200: providing a housing 21 with an opening 211;

S300: providing an end cap 23;

S400: making the electrode assembly 22 accommodated in the housing 21; and

S500: connecting the end cap 23 to the housing 21, so that the end cap 23 covers the opening 211 of the housing 21.

Here, the end cap 23 has an abutting surface 231 and a welding groove 232, the abutting surface 231 is configured to abut against the first tab 221, and the welding groove 232 is recessed from the side of the end cap 23 away from the electrode assembly 22, towards the abutting surface 231. The end cap 23 forms a connection part 233 between the abutting surface 231 and the bottom surface 2321 of the welding groove 232, and the connection part 233 is configured for being welded with the first tab 221. The end cap 23 is provided with a reinforcing part 234, the reinforcing part 234 is protruded from the bottom surface 2321, and the reinforcing part 234 is configured to enhance the strength of the connection part 233.

In the above method, the sequence of step S100, step S200 and step S300 is not limited. For example, step S300 may be performed first, then step S200 may be performed, and then step S100 may be performed.

It should be noted that, the battery cells 20 provided in the foregoing embodiments may be referred to, for obtaining the related structures of the battery cells 20 manufactured by the manufacturing method provided in the foregoing embodiments, which is not described herein again.

Figure 12:
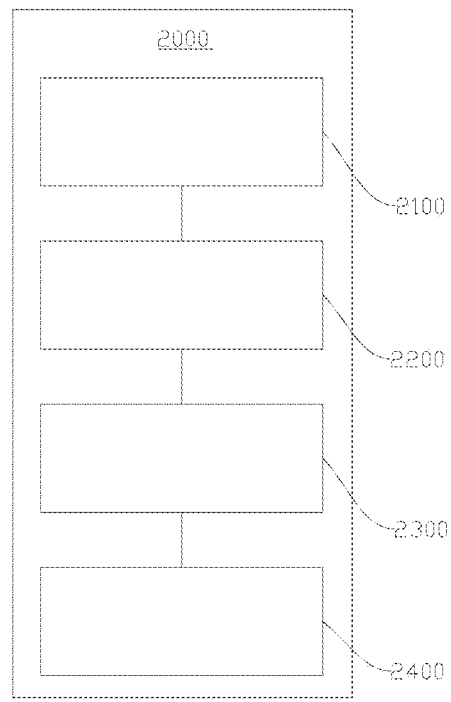
FIG. 12 is a schematic block diagram of a device for manufacturing a battery cell provided by some embodiments of the present application.

In addition, an embodiment of the present application further provides a device 2000 for manufacturing a battery cell 20. Referring to FIG. 12, FIG. 12 is a schematic block diagram of a device 2000 for manufacturing a battery cell 20 provided by some embodiments of the present application. The manufacturing device 2000 comprises a first providing device 2100, a second providing device 2200 and a third providing device 2300.

The first providing device 2100 is configured to provide the electrode assembly 22, and the electrode assembly 22 has a first tab 221. The second providing device 2200 is configured for providing the housing 21 and the housing has an opening 211. The third providing device 2300 is configured to provide the end cap 23. The assembling device 2400 is configured for making the electrode assembly 22 accommodated in the housing 21, and the assembling device 2400 is also configured for connecting the end cap 23 to the housing 21, so that the end cap 23 covers the opening 211 of the housing 21.

Here, the end cap 23 has an abutting surface 231 and a welding groove 232, the abutting surface 231 is configured to abut against the first tab 221, and the welding groove 232 is recessed from the side of the end cap 23 away from the electrode assembly 22, towards the abutting surface 231. The end cap 23 forms a connection part 233 between the abutting surface 231 and the bottom surface 2321 of the welding groove 232, and the connection part 233 is configured for being welded with the first tab 221. The end cap 23 is provided with a reinforcing part 234, the reinforcing part 234 is protruded from the bottom surface 2321, and the reinforcing part 234 is configured to enhance the strength of the connection part 233.

It should be noted that, the battery cells 20 provided in the foregoing embodiments may be referred to, for obtaining the related structure of the battery cell 20 manufactured by the manufacturing device 2000 provided in the foregoing embodiment, which not described herein again.

It should be noted that the embodiments in the present application and the features of the embodiments may be combined with each other in the case of no conflict.

The embodiments above are only used to illustrate the technical solutions of the present application, and are not intended to limit the present application. For those skilled in the art, the present application may have various modifications and changes. Any modifications, equivalent replacements, improvements, etc. made within the spirit and principle of the present application shall be covered by the protection scope of the present application.

What is claimed is:

1. A battery cell, comprising:
   an electrode assembly, having a first tab;
   a housing, having an opening, with the housing configured to receive the electrode assembly; and
   an end cap, configured to connect with the housing and covering the opening, wherein the end cap has an abutting surface and a welding groove, the abutting surface is configured to abut against the first tab, the welding groove is recessed from one side of the end cap away from the electrode assembly towards the abutting surface, the end cap forms a connector between the abutting surface and a bottom surface of the welding groove, and the connector is welded with the first tab,
   wherein the end cap is provided with a reinforcing structure, the reinforcing structure is protruded from the bottom surface of the welding groove, and the reinforcing structure enhances strength of the connector; and
   the connector is welded with the first tab to form a weld mark, the weld mark comprises a first part and a second part that are continuously arranged, and the first part is formed at the reinforcing structure, and the second part is formed on the connector.

2. The battery cell according to claim 1, wherein in a thickness direction of the end cap, the reinforcing structure has a first end and a second end oppositely arranged, and the first end is connected to the bottom surface; and
   a dimension of the reinforcing structure in an extending direction of the welding groove gradually decreases from the first end to the second end, so that at least one side of the reinforcing structure in the extending direction is provided with a sloping surface, the sloping surface is connected to the bottom surface, and the first part is formed on the sloping surface.

3. The battery cell according to claim 1, wherein the reinforcing structure is completely accommodated in the welding groove.

4. The battery cell according to claim 1, wherein the end cap is provided with a plurality of reinforcing structures arranged at intervals along an extending direction of the welding groove.

5. The battery cell according to claim 1, wherein the welding groove is an annular groove extending along a circumferential direction of the end cap; and
   the annular groove has an inner groove surface and an outer groove surface arranged coaxially, and the reinforcing structure is connected to the inner groove surface and the outer groove surface.

6. The battery cell according to claim 1, wherein the end cap comprises:
   a cap body to connect with the housing and covering the opening, wherein in a thickness direction of the end cap, the cap body has an outer surface and an inner surface arranged oppositely, and the welding groove is recessed from the outer surface towards the abutting surface; and
   a convex structure, wherein in the thickness direction of the end cap, the convex structure protrudes from the inner surface towards the electrode assembly, and one end of the convex structure away from the inner surface forms the abutting surface.

7. The battery cell according to claim 6, wherein in the thickness direction of the end cap, a distance between the bottom surface and the abutting surface is less than or equal to a distance between the outer surface and the inner surface.

8. The battery cell according to claim 6, wherein the end cap is provided with a liquid injection hole and a flow guiding channel, wherein
   the liquid injection hole is configured to allow electrolyte to enter an interior of the battery cell from outside of the battery cell, and an outer peripheral surface of the convex structure is located on an outer periphery of the liquid injection hole; and
   the flow guiding channel communicates with the liquid injection hole and penetrates the outer peripheral surface of the convex structure, and the flow guiding channel is configured to allow at least part of the electrolyte to flow to outside of the outer peripheral surface.

9. The battery cell according to claim 8, wherein the flow guiding channel is disposed at a position on the end cap corresponding to the reinforcing structure.

10. The battery cell according to claim 8, wherein the flow guiding channel is a flow guiding groove arranged on the abutting surface.

11. The battery cell according to claim 10, wherein the flow guiding groove has a first groove wall and a second groove wall opposite to each other; and the reinforcing structure comprises a first sloping surface and a second sloping surface opposing to each other, the first sloping surface and the second sloping surface are configured in such a way that a dimension of the reinforcing structure in an extending direction of the welding groove gradually decreases from one end of the reinforcing structure facing the bottom surface to one end of the reinforcing structure away from the bottom surface, the first sloping surface is parallel to the first groove wall, and the second sloping surface is parallel to the second groove wall.

12. The battery cell according to claim 8, wherein the end cap is provided with a concave structure, the welding groove is located on an outer periphery of the concave structure, the concave structure is recessed from the abutting surface in a direction away from the electrode assembly, and the flow guiding channel communicates with the liquid injection hole through the concave structure.

13. The battery cell according to claim 12, wherein the end cap has a liquid outlet surface located in the concave structure, and one end of the liquid injection hole penetrates the liquid outlet surface; and in the thickness direction of the end cap, the liquid outlet surface is farther from the electrode assembly than the abutting surface.

14. The battery cell according to claim 12, wherein one end of the flow guiding channel penetrates the outer peripheral surface, and the other end of the flow guiding channel penetrates an inner peripheral surface of the concave structure.

15. The battery cell according to claim 8, wherein the end cap is provided with a plurality of flow guiding channels, and the plurality of flow guiding channels are circumferentially distributed at intervals with the liquid injection hole as a center.

16. A battery, comprising:
the battery cell according to claim 1; and
a box, configured to accommodate the battery cell.

17. An electrical device, comprising the battery according to claim 16.

* * * * *